United States Patent [19]

Wu

[11] Patent Number: 4,762,399
[45] Date of Patent: Aug. 9, 1988

[54] VOLTAGE-BIASED LIQUID CRYSTAL OPTICAL POWER LIMITER

[75] Inventor: Shin-Tson Wu, Northridge, Calif.

[73] Assignee: Hughes Aircraft Company, Los Angeles, Calif.

[21] Appl. No.: 820,847

[22] Filed: Jan. 21, 1986

[51] Int. Cl.[4] .............................................. G02F 1/13
[52] U.S. Cl. .............................. 350/347 V; 350/342; 350/348
[58] Field of Search ................... 350/347 V, 342, 348, 350/783; 250/331

[56] References Cited

U.S. PATENT DOCUMENTS

| | | | |
|---|---|---|---|
| 3,898,977 | 8/1975 | Draper | 350/351 |
| 3,915,553 | 10/1975 | Adams et al. | 350/352 |
| 4,018,509 | 4/1977 | Boswell et al. | 350/342 |
| 4,042,302 | 8/1977 | Wentz | 356/364 |
| 4,272,195 | 6/1981 | Kaye | 350/347 E |
| 4,389,096 | 6/1983 | Hori et al. | 350/342 |
| 4,390,875 | 6/1983 | McNaney | 340/783 |
| 4,394,069 | 7/1983 | Kaye | 350/347 E |
| 4,410,238 | 10/1983 | Hanson | 350/347 E |

FOREIGN PATENT DOCUMENTS

| | | | |
|---|---|---|---|
| 0157643 | 12/1979 | Japan | 350/347 V |
| 0081818 | 7/1981 | Japan | 350/347 V |

OTHER PUBLICATIONS

S. D. Durbin et al., "Optical-Field-Induced Birefringence and Freedericksz Transition in a Nematic Liquid Crystal", *The American Physical Society*, vol. 47, No. 19, Nov. 1981, pp. 1411–1414.

A. D. Azarov, "Liquid Crystal Devie for Optical Radiation Control", *Inserum & Exp. Tech.* (U.S.A.), vol. 24, No. 2, Apr. 1981, pp. 489–491.

G. Labrunie and S. Valette, "Nematic Liquid Crystal Digital Light Deflector", Appl. Optics, vol. 13, No. 8, Aug. 1974.

*Primary Examiner*—Stanley D. Miller
*Assistant Examiner*—Huy Mai
*Attorney, Agent, or Firm*—Terje Gudmestad; Paul M. Coble; A. W. Karambelas

[57] ABSTRACT

A light detector (10) comprising a detector cell (12); a system for focusing light (14, 16, 18) on the cell; a liquid crystal (22) positioned in the light path; the liquid crystal (22) being prepared so that it passes light along the light path in the normal operating range of the detector cell (12) and directs light away from the light path when a threshold intensity of light is reached; and source of bias (24) across the crystal to enhance the recovery of the crystal (22).

6 Claims, 1 Drawing Sheet

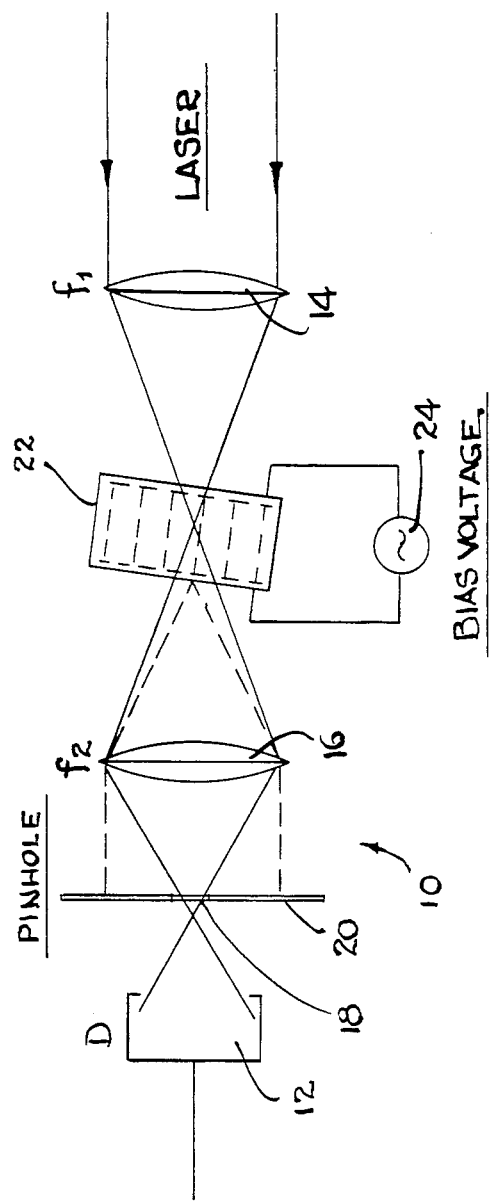

VOLTAGE-BIASED LIQUID CRYSTAL OPTICAL POWER LIMITER

BACKGROUND OF THE INVENTION

This invention relates to power limiters and, more particularly, to power limiters for broad band infrared detector circuits.

Infrared detector circuits are often used in situations in which an overload may occur causing the detector to be damaged and become unusable. For example, infrared detectors are often able to operate in ranges in which the amount of power to be detected is unknown. They are quite able to cope with power up to approximately $10^7$ watts/cm$^2$. However, if they encounter infrared signals over a threshold of approximately $10^8$ watts/cm$^2$, the detector unit may well be damaged or destroyed.

One of the difficulties encountered in solving the overload problem is that the time necessary for reaction must be very short in order to protect the detector circuitry; consequently, normal feedback circuitry operating off the response of the detector circuitry does not operate rapidly enough in some situations to accomplish a power reduction before damage has been done to the detector. Thus, the limiter, in order to react most rapidly, should assess the power of the infrared beam directly. This form of sensitivity is unusual in power limiters.

Another difficulty in providing a power limiter for infrared detectors is that such detectors often must operate over quite broad bandwidths. Consequently, the power limiting arrangements must also operate over similar broad bandwidths.

In a U.S. patent application Ser. No. 820,848, entitled *Liquid-Crystal-Based Optical Power Limiter*, Shin-Tson Wu and David M. Pepper, filed coincident herewith by the same assignee, a solution is provided in which a family of power limiters are described which utilize the properties of liquid crystals to provide rapid protection over a broad bandwidth. In each, a liquid crystal is placed in the optical path through which the signals to be detected are to proceed. The liquid crystal is arranged so that in its normal condition the infrared signals are passed to the detector cell without any significant distortion or reduction in power. However, when an overload signal is detected the liquid crystal cell is distorted so that the infrared beam is defocused or directed other than along the path to the infrared detector cell. Since it is well known that liquid crystal cells may be made responsive over a very broad bandwidth, the invention provides for rapid protection of power overload for the infrared detector cell over a very broad bandwidth.

However, there are situations in which it is necessary to have the detector cell begin operating again as quickly as possible after an overload condition stops. Although the initial reaction time of the power limiters disclosed in the application mentioned above is sufficient to protect the cell, they often have too long a recovery time to be used in such situations.

It is, therefore, an object of this invention to provide a power limiter for protecting infrared detectors which has an extremely rapid recovery time.

It is another object of this invention to increase the overall speed of operation of power limiters.

An additional object of this invention is to provide a broad-band power limiter for light detectors with a rapid recovery time.

SUMMARY OF THE INVENTION

These and other objects of this invention are realized in an infrared detector having a detector cell, a system for focusing light on the cell, and a liquid crystal positioned in the light path, the liquid crystal being prepared so that it passes light along an optical path in the normal operating range of the detector cell and directs or diverges light away from the optical path when a threshold intensity of light is reached. In order to provide a rapid recovery, a bias voltage is provided for the liquid crystal to speed molecular reorientation.

Other objects and advantages of the invention will be better understood by reference to the specification taken in conjunction with the detailed drawings in which reference numerals refer to like elements throughout the various views.

BRIEF DESCRIPTION OF THE DRAWINGS

The single FIGURE is a side view of a power limiter constructed in accordance with the invention.

DETAILED DESCRIPTION OF THE INVENTION

Liquid crystal cells have been used as light valves for controlling the flow of infrared signals. For example, U.S. patent application Ser. No. 805,635, entitled *Dual Liquid Crystal Based Visible-to-Infrared Dynamic Image Converter System*, mailed to the Patent and Trademark Office on Dec. 4, 1985, by the present inventor and assigned to the assignee of this invention discloses the use of a dual liquid-crystal-based visible-to-infrared image detector which may make use of the twisted nematic arrangement of the liquid crystal or other arrangement of the liquid crystal for controlling the infrared signals. However, liquid crystals have not been used as power limiters in light detection circuits.

Researchers have determined that liquid crystals respond to changes in light intensity and in temperature caused thereby in much the same manner as they respond to changes in biasing potentials. See "Optical Field Induced Birefringence and Freederichsz Transition in a Nematic Liquid Crystal," Durbin, Arakelian, and Shen, *Physical Review Letters*, Vol. 47, No. 19, Nov. 9, 1981. For example, it has been determined that above a certain threshold of light intensity, a liquid crystal repolarizes so that the directors are aligned with the path of the light passing therethrough. It has also been determined that as a high intensity light beam passes through a liquid crystal, the heat therefrom, if above a threshold level, can cause defocusing of the light passing through the liquid crystal.

In copending U.S. application, Ser. No. 820,848, referred to supra, a number of power limiting arrangements are disclosed in which these properties of liquid crystals are utilized. In each of these arrangements one or another of the characteristics of the liquid crystal when subjected to high intensities of light is utilized to provide the power limiting function.

For example, a first infrared detector has a polarizer, a liquid crystal, and an analyzer arranged in the light path, the crystal being prepared in such a manner as to produce a parallel, perpendicular or twisted nematic liquid crystal. The arrangement is prepared so that light is transferred to the detector cell in the normal operating condition of the detector 10. When, however, the infrared light reaches a threshold intensity which may be capable of damaging or destroying the detector cell, the same intensity of the infrared light causes the directors of the liquid crystal to realign so that those directors tend to lie parallel to the polarization axis of the infrared beam. This alters significantly the birefringence or the twisting effect of the nematic liquid crystal and allows the light to pass directly through the crystal without a change in its orientation. This causes the infrared beam to be rejected by the analyzer thus limiting the power applied to the detector cell before it can be damaged.

Another infrared detector passes light through a lens system, a liquid crystal, and an aperture on the way to the detector cell in the normal condition. The liquid crystal is prepared so that the directors thereof lie parallel to light passing through the crystal; consequently, that light is not affected by the crystal in its normal operating state and is focused to pass through the aperture. When the light intensity reaches a certain level, a refocusing effect occurs in the liquid crystal. This defocuses the entire lens system so that a substantial portion of the light is no longer focused through the aperture and the power to the detector cell is limited before damage can occur.

The final detector has a detector cell which receives light which passes through a first prism, a nematic liquid crystal, and a second prism. The velocity of light passing through the liquid crystal is, of course, dependent upon the orientation of the light because a liquid crystal has different indices of refraction parallel and perpendicular to the orientation of the optical axis of the material. When the intensity of light reaches a particular level, the indices of refraction are varied in the liquid crystal so that the light is directed through the crystal at the second prism at a different angle thereby diverting it from the normal light path and again limiting the power applied to the cell.

Such detectors, although able to react quickly to detect overload conditions, have proven slow to realign to the desired operating state. In many situations it is necessary that such detectors come back on line very rapidly. The present invention resolves this problem.

The single figure illustrates a detector circuit 10 having a detector cell 12 upon which light is focused by means of a lens system including a first lens 14, a second lens 16, and an aperture 18 in a plate 20. Arranged between the first and second lenses 14 and 16 is a liquid crystal cell 22 prepared in the normal nematic form. However, an A-C bias 24 is applied across the crystal 22 to reorient the directors of the crystal 22 so that they lie close to, but not quite parallel to, the optical path of the light. Thus, in the normal operating condition of the detector 10, the crystal 22 has a small birefringent effect on the light. However, this has no effect in the normal operating condition of the detector 10, for the light is simply focused to a point at the aperture 18 by the lenses 14 and 16 and falls upon the detector cell 12.

When an overload intensity of light, however, reaches the crystal 22, the crystal 22 heats, thereby defocusing. This defocuses the entire lens system so that a substantial portion of the light no longer passes through the aperture 18 thereby limiting the power to the cell 12. In addition, when a particular intensity of light is reached, the indices of refraction of the liquid crystal 22 also change resulting in self-focusing or self-defocusing. The higher the incident power, the larger the self-action effect and, therefore, a relatively constant output from the aperature 18 results.

It has been determined that the time it takes for the liquid crystal to defocus and change its index of refraction is inversely proportional to the intensity of light applied to the crystal; and thus the device makes an excellent power limiter. It should be noted that the threshold intensity at which the crystal 22 begins to distort is a function of the bias of the liquid crystal 22 and may be controlled by adjusting the level of the bias 24 applied to the liquid crystal 22.

When the overload condition is removed the bias forces the very rapid recovery of the liquid crystal 22 so that it may function again as the central element of the power limiter. It has been determined that the recovery time for the liquid crystal 22 is proportional to the bias voltage applied across the cell. Consequently, it may be made to respond more rapidly by increasing the bias.

While the invention has been described herein with reference to particular detailed embodiments, many modifications will occur to those skilled in the art which are within the spirit and scope of the invention. For example, each of the examples of power limiters illustrated in the copending U.S. patent application Ser. No. 820,848, referred to supra, may also be made to recover more rapidly by the application of a bias potential. It is, therefore, intended that the invention be limited only by the language of the claims which are appended hereto.

What is claimed is:

1. An optical power limiter for limiting the amount of light from a light source impinging on a detector cell comprising:

a detector cell;

a lens system for focusing light to a point along an optical path between the detector cell and a source of light;

a liquid crystal having parallel aligned directors and being prepared to pass said light along said optical path when the light intensity of said light is in the normal operating range of said detector cell and defocuses the light when the light intensity reaches a threshold intensity of said detector cell, said liquid crystal further being oriented in said optical path with its directors lying at a slight angle to the optical path;

a plate having an aperture to allow the transfer of light at said point; and means for applying a bias voltage bias across the liquid crystal to enhance recovery of the liquid crystal.

2. A liquid crystal as defined in claim 1 wherein said lens system comprises a first lens positioned in said optical path in front of said liquid crystal and a second lens positioned in said optical path between said liquid crystal and said detector cell.

3. A liquid crystal as defined in claim 3 wherein said first and second lenses are convex lenses.

4. An optical power limiter for limiting the amount of light impinging on a detector cell disposed along an optical path comprising:

a first lens positioned in the optical path;

a second lens positioned in the optical path following said first lens, said first and second lenses arranged for focusing light to a point along the optical path adjacent to the detector cell;

a plate having an aperture therein along said optical path at the focal point of said first and second lenses;

a liquid crystal positioned in the optical path between said first and second lenses and wherein said liquid crystal is selected to provide defocusing of the first and second lenses for light above a preselected intensity such that a substantial portion of the light no longer passes through the aperture; and means for applying a bias voltage across the liquid crystal to enhance recovery of the liquid crystal.

5. An optical power limiter as defined in claim 4 wherein said liquid crystal has parallel aligned directors and is oriented in said optical path with said directors lying at a slight angle to said optical path.

6. An optical power limiter as defined in claim 2 wherein said first and second lenses are convex lenses.

* * * * *